United States Patent Office 3,563,700
Patented Feb. 16, 1971

3,563,700
PROCESS FOR MAKING SATIN WHITE
Morrison N. Stiles, Charlotte, N.C., and George M. Simpson, Rock Hill, S.C., assignors to Bowaters Carolina Corporation, Catawba, S.C., a corporation of Delaware
No Drawing. Filed Apr. 25, 1968, Ser. No. 724,262
Int. Cl. C09c 1/02; C01f 7/02
U.S. Cl. 23—52    11 Claims

ABSTRACT OF THE DISCLOSURE

A process of preparing a satin white pigment by reacting an alum solution with a high purity hydrated lime slurry. The alum solution is added to the lime slurry while rapidly agitating the reaction mixture. The total amount of water present in the reaction mixture is regulated to control both the initial amount of lime which is solubilized and the amount of satin white solids present in the reaction mixture upon completion of the reaction. The temperature is regulated throughout the reaction, the alum is added at a controlled rate, and the reaction is terminated when the pH of the reaction mixture is between about 12.3 and 9.5. Starch may be added upon completion of the reaction and the resultant mixture may be dewatered to a relatively high solids content. The resultant mass, upon application of shear, breaks down to a free flowing, pumpable liquid.

FIELD OF INVENTION

The present invention is directed to an improved process of making a satin white pigment. More particularly, the present invention is directed to a method of making satin white pigment which will consistently yield a uniform product suitable for use in lightweight paper coatings.

Satin white is a calcium sulfoaluminate pigment which is bright, white, and fairly opaque. It is generally obtained by adding a sufficient amount of alum to slaked lime to obtain an end product having a pH between 10.0 and 12.0. A recent publication (TAPPI Monograph Series, No. 30, Paper Coating Pigments, pp. 141-157, 1966) indicated that, based on X-ray diffraction studies, satin white prepared from lime and alum is a single crystalline species through the pH range of from 12.0 to 9.0, represented by the formula $3CaO \cdot Al_2O_3 \cdot 3CaSO_4 \cdot 32H_2O$.

BACKGROUND OF INVENTION

Satin white has long been used in coating paper; it was first used probably as early as 1879. It is valued for its brightness, whiteness, and ability to calender to a glossy finish. Furthermore, it is reasonably cheap to manufacture. However, as the quality of clays improved in brightness, color, and uniformity, interest in satin white as a paper coating pigment, particularly in the United States, greatly diminished. In addition to the improvements in clays, the decline in the use of satin white as a paper coating pigment in the United States was hastened by the fact that it requires a relatively large amount of binder, making the use of satin white expensive, and because prior art processes of producing satin white result in a non-uniform, non-reproducible product.

In recent years there has been a trend towards the use of lighter weight papers. The weight of the paper rawstock is more or less fixed since the paper fibers are the repository of the strength of the paper and the paper web must have a certain minimal strength to withstand the stresses of high speed printing. Thus to obtain a lighter weight paper it is almost essential to reduce the coating weight. An obvious way to reduce the coating weight is to use either less or lighter weight pigment in the coating composition.

A lighter weight, but equally satisfactory, coating must "fill" the paper sheet to the same degree as a heavier coating. In other words, to give a coated paper of equal quality, the paper coating must fill the same volume of voids in the rawstock, regardless of weight of the coating. Satin white prepared in accordance with the present invention has a specific gravity of about 1.53 at room temperature. This compares to a specific gravity of about 2.6 for clay and carbonate pigments. In addition, satin white contains about 32 mols of water of crystallization, at least 20 of which are lost during the drying of the paper coating. Thus the specific gravity of the satin white contained on the coated paper is even less than 1.53.

Acicular pigments tend to entrap a larger volume of voids in the rawstock, as the coating dries, than pigments of most other shapes. Satin white pigment particles are acicular, when properly prepared. However, unlike nearly all pigments having a particle shape which tends to entrap an unusually large volume of voids, satin white pigments are not deleterious to the gloss of the coated paper. Since satin white has a low specific gravity and is acicular, in addition to being bright, white, fairly opaque, and easily calendered to a glossy finish, it is extremely well suited for use in light weight paper coating compositions. Not only does satin white have a lower specific gravity than most other pigments employed in paper coating compositions, but additionally, because it is acicular, less volume is required than most other pigments to obtain equal quality coatings.

It is apparent that satin white would make a very desirable pigment for use in lightweight paper coating compositions if it could be consistently prepared in such a manner as to yield a uniform product.

PRIOR ART PROCESS

As previously noted, satin white has been made by interacting alum $[Al_2(SO_4)_3 \cdot 18H_2O]$ with slaked lime. Two general methods have been employed; the high solids method and the low solids method. The high solids method entails the addition of a concentrated alum solution to a lime paste, followed by mixing in a high density mixer. The amount of water used is such that the finished paste contains about 30% solids.

The low solids method involves incorporating a solution containing about 10% by weight alum into a slurry containing about 5% by weight calcium oxide until the reaction is completed. In the paper coating industry the reaction is considered completed when the pH is within the range of 10.0 to 12.0. After completion of the reaction, the resultant slurry is subjected to filter pressing, whereby a paste that ordinarily contains about 20–30% solids is obtained.

A typical prior art process of preparing satin white is described as follows in TAPPI Monograph Series, No. 20, Paper Coating Pigments, page 144 (1958):

"The formula first worked out consisted in placing about 1000 lbs. of wet slaked lime (equivalent to 320 lbs. dry) in a tank fitted with a powerful double agitator, diluting with about 105 gal. of water and adding to this as rapidly as possible 440 lbs. of aluminum sulphate and 50 lbs. of anhydrous sodium sulphate (or its equivalent Glauber's salt) dissolved in 60 gal. of water. Actual addition of the sulphate solution required about 1.5 min., and the mixing of the charge was continued for about half an hour after the alum was all added, when it was then ready to be drawn off or use or storage. Such a method and formula gave a product of about 22% total solids at 135 to 140° C., and it had an alkalinity equivalent to 25% $Ca(OH)_2$. The coarse matter retained on a 200-mesh screen varied from 0.51 to 2.26% of the total dry matter, and over a period of a month it averaged 1.13%."

SUMMARY OF THE INVENTION

It has now been found that it is possible to consistently make, by reacting an alum solution with a lime slurry, a uniform grade of satin white particularly suitable for use as a paper coating pigment, if the process variables are properly controlled. This unique process requires the use of high purity reactants, high speed mixing of the reaction mixture throughout the reaction period, control of the temperature throughout the reaction, regulation of the amount of water present in the reaction mixture so that both the initial amount of the lime which is solubilized and the amount of satin white solids present in the reaction mixture upon completion of the reaction are maintained within particular limits, control of the alum addition rate, and termination of the reaction while the pH of the reaction mixture is within a particular range.

The first process step entails preparing an aqueous slurry from hydrated lime which contains at least 97% by weight $Ca(OH)_2$, i.e., the hydrated lime should not contain more than 3% impurities. The slurry should contain sufficient water so that initially from about 1.0% to about 5.7% by weight of the $Ca(OH)_2$ present is solubilized at the temperature of the water employed.

To this slurry an aqueous alum solution is added. Preferably the alum solution is sprayed into the lime slurry at a substantially uniform rate. The rate of alum addition should be controlled so that a substantial portion of the solubilized lime concentration can be maintained until near the completion of the reaction. Preferably the alum should be of a relatively high purity; a grade of alum designated commercially as "low iron" which contains less than 1100 parts per million (p.p.m.) is adequate. The addition of alum should be terminated when the pH of the reaction is between 12.3 and 9.5.

The reaction mixture should be rapidly agitated throughout the reaction period. Agitation should be sufficiently rapid so that a fast moving vortex is maintained in the reaction mixture. A Cowles dissolver is well suited for agitating the reaction mixture.

The reaction between the alum and hydrated lime is highly exothermic. It has been found that to attain a product having the desired properties, it is essential to maintain the temperature of the reaction mixture in the range of from about 85° F. to about 110° F. substantially throughout the reaction period.

The total amount of water present in the reaction mixture, that is the amount present in the initial lime slurry plus that contributed by the alum solution, must also be regulated. If too little water is present the mixture becomes too viscous to obtain good mixing; if too much water is present there is too little shear with any but very high speed mixers. In either event, the quality of the product is degraded. The total amount of water present in the reaction mixture should be such that, at the termination of the reaction, an aqueous mixture is obtained which contains between about 5% and 12% by weight satin white solids, calculated at 105° C. (221° F.) and based on the total weight of the water and the reactants employed.

A starch adhesive may be added to the mixture obtained upon completion of the reaction. The resultant mixture may be partially dewatered, as by filter pressing, to obtain a mass having a relatively high solids content. This mass, upon the application of shear, breaks down to a free flowing, pumpable liquid.

DETAILED DESCRIPTION OF THE INVENTION

The first important aspect of the present invention is the use of high purity reactants. It is found that a much better product was obtained using hydrated lime rather than slaked lime. Good grades of commercially available quick lime were found to contain extensive sand contamination which could not be completely screened out, even with 325 mesh screens. Any sand in the lime would be a source of grit in the final product, which would obviously degrade the product's usefulness in paper coatings. The hydrated lime should assay at least 97% $Ca(OH)_2$; even lime sources assaying as high as 95–96% $Ca(OH)_2$ result in a marked dropoff in the quality of the product. To obtain a lime having the desirable purity, it of course, must be fresh, as lime slowly converts to $CaCO_3$ in the presence of air or moisture.

The purity of the alum is also important. It has been found that the grade of alum sold commercially as "low iron" which contains between 300 and 1100 p.p.m. is satisfactory. The grade of alum sold commercially as "iron-free," containing between 50 and 150 p.p.m. iron, may, of course, also be used. If alum having a high iron content is used, the satin white obtained tends to be less white.

Another important factor which must be controlled is the total amount of water which is incorporated into the batch. The total amount of water is, of course, a function of both the amount of water present in the lime slurry and the amount of water added with the alum solution. This factor will be discussed in more detail later.

In addition to the importance of the total amount of water added to the batch, it has also been found that it is important to regulate the amount of water used to prepare the lime slurry so that the initial lime solubility falls within a narrow range. It has been found that if the solubility of the lime is significantly above 5.7% by weight, based upon the total amount of lime employed, or significantly below 1.5% by weight, based upon the total amount of lime employed, an inferior product will be obtained. It is preferred to regulate the slurry so that the initial lime solubility is between 2.0% and 4.5% by weight. Of course, during the reaction, as lime is consumed by the reaction, and water is donated from the alum solution, the amount of soluble lime, in relationship to the total amount of lime present, increases.

The strength of the alum solution is not as critical as the initial strength of the lime slurry, as it may be varied somewhat with other factors. For example, the more vigorous the agitation, the stronger the alum solution may be. Saturated alum solutions may be used and there is no lower limit on the strength of the alum solution, so long as it is not so dilute as to add too much water to the reaction mixture. It is preferred, from a commercial point of view, to use concentrated liquid alum solutions as supplied by commercial vendors. Such solutions are sufficiently short of saturated that normal temperature changes do not tend to cause precipitation. By using alum solutions supplied by commercial vendors, it is possible to save labor, avoid separate alum storage, and bypass control problems in preparing solutions of the required strength.

It has further been found that it is very important to rapidly agitate the reaction mixture as the alum is added. On a laboratory scale, satisfactory results are obtained with a variable speed Lightnin' mixer operating at top speed using as an impeller the head from a Cowles dissolver. This mxier may be operated at 1750 r.p.m.; using a head having a diameter of 1 9/16 inches, a tip speed of 716 feet per minute is obtained. On a production scale, it is preferred to use a Cowles dissolver which has a capability of operating at 670 r.p.m. with a 25 inch diameter head, giving a tip speed of 4,385 feet per minute. Of course, the type of mixer used will vary depending on the size of the reaction vessel and charge used. Rapid agitation as used herein refers to mixing with a high speed mixer in such a manner that a fast moving vortex is maintained throughout the reaction period.

Another important factor is the rate of addition of the alum to the lime slurry. The alum solution should be added to the lime slurry at a rate of no less than 2.5 minutes for every 1% by weight satin white solids (calculated as satin white at 105° C. and based on the total weight of the water and reactants employed) present in the batch at the termination of the reaction. Preferably, the alum is added at a rate of no less than 3.0 minutes for every 1% by weight satin white solids present in the batch at the termination of the reaction. Thus, for a 5% solids batch, the alum should be added over a period of no less than 12.5 minutes and preferably over a period of no less than 15 minutes. For a 10% solids batch, the alum should be added over a period of no less than 25 minutes, and preferably over a period of no less than 30 minutes. The final product is not effected if the alum is added over very long periods, but periods longer than 3.0 minutes for every 1% by weight of satin white solids present in the batch at the termination of the reaction do not appear to result in any improvement in the product. The alum solution is preferably introduced, at a fairly uniform rate, directly into the vortex in the form of a spray or droplets. While the alum solution is preferably added continuously, it may be added incrementally.

The importance of high speed mixing and the alum addition rate are believed to be interrelated. Hydrated lime is only sparingly soluble in water while alum is highly soluble. It is reasonable to assume that the reaction between the hydrated lime and the alum is at least initiated from solubilized material. It seems likely that alum can be added at a sufficiently rapid rate so that, at the point of addition, not only would the solubilized lime be exhausted from solution, the alum would be entering the reaction mixture faster than the solubilized lime could be replenished from the undissolved particles in the suspension. Should this happen, the forming satin white would tend to encapsulate lime particles in the slurry, resulting in a non-uniform product. Thus the quality of the product will be degraded, because of unduly large local concentrations of alum, if the alum solution is added too rapidly or the reaction mixture is not agitated rapidly enough to disperse the alum solution throughout the reaction mixture.

It has also been found, to obtain a product having the desired properties, that it is necessary to control the temperature of the reaction mixture so that it is maintained within a relatively narrow range. Lime is more soluble in cold water than it is in hot water; therefore it would seem logical to expect that optimum results would be obtained if the temperature of the reaction mixture were maintained at a relatively low temperature such as 60° F. to 75° F. However, it has been found, surprisingly, that the properties of the product were improved substantially if the temperature is raised to 85° F. It has further been determined that the properties of the product tend to deteriorate above about 110° F. Preferably, the temperature of the reaction mixture is maintained between 95 and 105° F. throughout the reaction period. The reaction between alum and lime is highly exothermic. For example, if a lime slurry and an alum solution, both at 75° F., are mixed quickly, even in very small batches, the mass will rapidly rise to a temperature of over 140° F. It is apparent that, particularly with large batches, there is a danger of overheating with resultant degradation of the properties of the finished product, unless the temperature of the reaction mixture is carefully controlled. Temperature can be regulated by the use of water jacketed mixing vessels and other means known in the art. Of course the rapid mixing helps to minimize the possibility of local overheating. The temperature of the lime slurry and/or the alum solution may be, initially, somewhat below 85° F.; the exothermic nature of the reaction will rapidly bring the reaction mixture into the desired range.

Another factor which strongly influences the characteristics of the product is the pH at the termination of the reaction. The reaction between alum and lime is not self-limiting; it does not stop of its own accord within the desired pH range. If enough alum is added to the lime, the reaction, continuing to a very low pH, results in the production of $CaSO_4$ and $Al_2O_3$. These are, of course, unwanted products. It has been found, to obtain the desired product, the reaction must be terminated when the pH is within the range of 12.3 to 9.5. Preferably, the reaction is terminated when the pH is within the upper end of this range, such as above 11.8. A preferred pH range is 12.1 to 11.9; ideally the reaction is terminated at a pH of about 12.0. If the reaction is not terminated until the pH has declined below 11.8, the viscosity of the reaction mixture increases and a product is obtained which, while satisfactory, is quite puffy and has less gloss, and does not flow as readily as the product obtained within the preferred range. Furthermore, coating compositions compounded from a product obtained at a pH of less than 11.8 require more adhesive than similar compositions containing satin white obtained within the desired range. The product obtained below a pH of 9.5 is not suitable as a coating pigment.

The alum should be added to the lime slurry, rather than the reverse, and the desired end point should be approached with care. Although, if the pH drops below the desired level, it may be brought back into the desired range by adding additional lime, this correction step must be done carefully so that the quality and uniformity of the end product will not be affected.

As previously mentioned (TAPPI Monograph Series, No. 30, supra), satin white within the pH range of 12.0 to 9.0 has been described as consisting of a single crystalline species. This infers, incorrectly, that the same product is obtained throughout the pH range of 12.0 to 9.0. An earlier publication (TAPPI monograph Series, No. 20, supra) shows a curve reflecting the change in pH as lime is titrated with alum and postulates that three distinct products are obtained corresponding to three sharp inflection points (one at a pH of about 12.2 and two at a pH of about 9.25). While the general shape of the titration curve given in this publication is accurate, it is not a sufficient index of the changes to be observed in the end product. The smoothness of the curve would lead one to expect gradual changes; other evidence indicates violent changes. It has been found that as alum is added to a lime slurry, four general areas may be observed. The first area is observed at a pH of about 12.4; as this pH is approached, the viscosity of the reaction medium increases substantially. As additional alum is added, the viscosity tends to decrease, somewhat less sharply than it increased. As the second general area is approached, at a pH of about 10.8, there is again a noticeable rise in viscosity. As previously mentioned, the product obtained in this area tends to be puffy and requires more binder than the product obtained at a pH of around 12.0. The third general area is observed after reaching the first of two inflection points observed at a pH of about 9.25. As additional alum is added, an area of severe fluctuation in pH is observed, strongly suggesting changes in the type of material produced. The product obtained in this area is very poor for coating. The fourth area is just beyond the second of the two inflection points observed at a pH of 9.25, but still above a pH of 9.0. The product obtained in this area is of such poor quality that it is useless for coating. The above observations suggest that the X-ray of examination for satin white is insufficient to adequately determine when satin white having properties suitable for paper coating is obtained. It further suggests that distinctly different products are obtained throughout the pH range of from about 12.4 to 9.0. The importance of rapid agitation and a proper alum addition rate can be inferred from these observations. The alum should be added in such a manner that the reaction is terminated when the desired product is obtained. Clearly this is to be preferred over a process in which the pH at which a desired product may be obtained is exceeded, either locally or in a batch as a whole, and then corrected back to the desired point.

As previously mentioned, another important factor which must be controlled is the total amount of water incorporated in the batch. The total amount of water incorporated into the batch from the lime slurry and the alum solution should be regulated so that the batch, upon completion of the reaction, contains between about 5% and about 12% by weight satin white solids, calculated as satin white at 105° C. and based on the total weight of the water and reactants employed. Preferably the batch is controlled so that the final satin white solids are within the very narrow range of 9% to 11% by weight based on the total weight of the water and reactants employed.

If the satin white solids are allowed to go above 12% by weight, the reaction mixture tends to become so viscous that rapid mixing is difficult. If the reaction mixture is not rapidly agitated there will be local buildups in the alum concentration, resulting in encapsulation of lime particles in the satin white and preparation, locally, of products outside the desired pH range.

It is noted, that to regulate the final satin white solids within the narrow preferred range, the possibility of manipulating the initial lime solubility over a significant range decreases. Furthermore, as previously mentioned, it is desirable from a commercial point of view to use alum solutions as supplied by commercial vendors. Fortunately, commercially available concentrated alum solutions are of such strength that when used with a lime slurry containing, initially, about 2% solubilized lime, a batch containing 9% to 11% satin white solids is obtained.

The meaning of the expression "satin white solids" in the reaction mixture at the completion of the reaction may be illustrated by the following. It may be assumed that the reaction forming satin white is:

$$Al_2(SO_4)_3 \cdot 18H_2O + 6Ca(OH)_2 + 8H_2O \rightarrow 3CaO \cdot Al_2O_3 \cdot 3CaSO_4 \cdot 32H_2O$$

Thus, theoretically, 66.64 grams of aluminum sulfate and 44.4 grams dry weight of calcium hydroxide react to form 125.44 grams of calcium sulphoaluminate, or a yield of 113.0 percent at room temperature. It has been found that these theoretical figures are not met in actual practice. A typical example of actual results is:

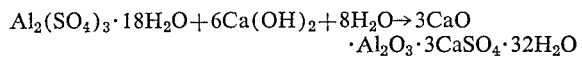

63.7 g. alum+45.4 g. of hydrated lime containing 97.7% Ca(OH)$_2 \rightarrow$ 120.2 g. satin white at room temperature The yield at room temperature is not as significant as the equilibrium yield at 105° C. Since paper coatings are dried at approximately 105° C., the yield at this temperature is much closer to what can be expected to remain on the paper after the coating has dried. Therefore, the yield at 105° C. is more germane for estimating coating weights and for making cost calculations. It has been found that satin white at 105° C., because of moisture loss (water of crystallization) weighs only 71.5% of its room temperature weight. Thus the above formula may be written:

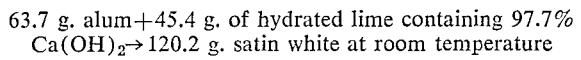

63.7 g. alum+45.4 g. hydrated lime containing 97.7% Ca(OH)$_2 \rightarrow$ 86 g. satin white at 105° C.

The conversion of the 86 gram yield into a percent by weight satin white solids based on the total weight of the water and reactants employed may be illustrated by the following specific example.

A lime slurry containing 45.4 grams of hydrated lime containing 97.7% (44.4 grams) calcium hydroxide and 680.5 grams of water is prepared. The temperature of the slurry and the reaction mixture is maintained at 95° F. The solubility of lime at this temperature is 0.148 gram per 100 cc. water, giving an initial lime solubility of 2.27% by weight based on the total amount of lime employed. With rapid agitation, such that a fast moving vortex is maintained in the reaction mixture, 116.8 grams of low iron alum solution containing 27.99% aluminum sulfate (63.7 grams Al$_2$(SO$_4$)$_3 \cdot$ 18H$_2$O) is added at a substantially uniform rate over a period of approximately thirty minutes. At the completion of the alum addition the pH of the reaction mixture is about 12.0. At room temperature, 120.2 grams of satin white are obtained; at 105° C., 86.0 grams of satin white are obtained. Since the total weight of the reactants and the water is 842.7 grams (45.4 grams hydrated lime slurried in 680.5 grams water plus 116.8 grams alum solution) the reaction mixture contains 10.2% by weight satin white solids at 105° C., based on the total weight of the water and the reactants employed.

Coating compositions containing the satin white obtained by the method of the above example can be coated onto two sides of paper rawstock employing a total coating weight of approximately 4.8 pounds per ream (3,300 sq. ft.). The resultant paper will exhibit high gloss, high opacity, good brightness, pick and smoothness.

Following the procedure outlined above, it is possible to reproducibly prepare satin white of outstanding quality. The material may be charged directly to a filter press to be substantially dewatered. However, if this is done the resultant material is somewhat difficult to handle. Many agents are known which will influence the rheology of satin white, such as certain surfactants or various materials, such as casein and gum arabic, which are known to be useful as adhesives. It has been determined that starch binders, such as those known in the trade as "oxidized" starch and "ethylated" starch are extremely useful additives, permitting satin white to be easily handled after it has been partially dewatered to a high solids content. Starches of various type have long been used as pigment binders for paper coatings. In practically all cases, the starches have been subjected to all treatments to reduce their molecular weight, and hence permit higher concentrations at reasonable viscosity. These treatments involve reactions with acids, hypochlorites and other oxidizing agents, hydrolytic enzymes and the like. For example, corn, tapioca, or potato starches may be treated with ethylene oxide to produce hydroxyethyl starch ethers of a low degree of substitution. Similarly, aqueous suspension of common starches may be treated with hypochlorite solutions by procedures well known in the art, to produce oxidized starches. Likewise, starches may be treated with acids and enzymes. Oxidized starches are particularly suitable for use with the present invention.

The preferred procedure is to add liquid oxidized starch, usually at concentrations of 25 to 35% oxidized starch, in amounts sufficient so that the amount of dry oxidized starch is 10% of the satin white solids at 105° C., to the reaction mixture after completion of the batch, before subjecting the batch to filter pressing. If this procedure is followed, the cake obtained from the filter press readily breaks down, when shear is applied, to a consistency which will flow smoothly. The starch can be added to the satin white after filtration of the completed reaction mixture. However, if this is done, mixing is much more difficult since the satin white, in the absence of starch, is much more resistant to breakdown by shear and it is therefore difficult to disperse the starch evenly through the satin white cake.

In a typical production arrangement, oxidized starch is added after completion of the alum-lime reaction. Part way through the starch addition, the viscosity increases greatly and apparently all mixing ceases. This is only a temporary phenomenon, however, and in a short time viscosity decreases and thorough mixing ensues. The viscosity of the resultant mixture is less than that of the reaction mixture prior to the starch addition. The reaction mixture, as modified by the starch addition, is pumped to storage. As satin white is needed, the mixture is pumped to a filter press. When the filter pressing operation is completed, the cake is dumped on a conveyor belt, discharged into a mixer, such as a Cowles dissolver, and subjected to shear. The material is completely liquefied in a few minutes. As the level of this material builds up in the tank, it is incrementally pumped into storage or into other tanks in which it is compounded into a coating formula.

While 10% by dry weight of oxidized starch, based on satin white solids at 105° C., is preferred, there is a great deal of latitude with respect to the amount of oxidized starch which can be added to the satin white batch after completion of the reaction to accomplish the desired results. Ten percent is a convenient amount to use, since it is an easy figure with which to make subsequent calculations. Seven percent by dry weight is sufficient. More than 10% oxidized starch can be employed without detriment, and in fact, may be advantageous, if it is intended to use oxidized starch as the binder to the ultimate coating formula. If oxidized starch is used as the binder in the ultimate coating composition, more than 10% starch is required. Oxidized starch is very commonly used in paper coating compositions, and is not deleterious to paper coating compositions in which it does not appear. Since the amount of oxidized starch employed to render the satin white capable of being converted to a smooth flowing liquid can be calculated as part of the total binder requirement of the paper coating composition, unlike special surfactants or special adhesives, it represents no addition to the cost.

It has been found that hot starch may be added to the satin white batch without harm to the satin white. While temperatures in the range of 160° to 180° F. are harmful to satin white, it has been found that the addition of starch in this temperature range did not substantially affect the quality of the satin white.

ILLUSTRATIVE EXAMPLES

To demonstrate the effect of the various factors which have proven to be important in obtaining a satin white eminently suited for use in lightweight paper coatings, satin white was prepared under a variety of conditions. The resultant products were incorporated into standard paper coating compositions. Standard rawstock was coated with these compositions, and the coated rawstock thus obtained was dried and super calendered under standard conditions. The coating was applied to both sides of the paper, using a laboratory trailing blade, in amounts of approximately five pounds of coating per ream (3,300 sq. ft.). Observations and tests run on these sheets enabled an accurate appraisal of differences that resulted from changes in the method of manufacturing the satin white. In preparing these standard samples an effort was made to achieve a Dennison wax pick of six for all formulas. However, with unknown coatings this is not calculable ahead of time.

Two standard coating compositions were employed; in the first, referred to as formulation A, satin white constituted approximately 50 percent of the pigment present in the composition. In the second coating composition, referred to as formulation B, the satin white comprised only 40 percent of the pigment present. In both compositions the remainder of the pigment comprised a major amount of clay along with a minor amount of titanium dioxide. The basic coating formulas employed are set out below in Table I.

TABLE I

| Ingredients | Formulation A | | Formulation B | |
|---|---|---|---|---|
| | Dry, lbs. | Wet, lbs. | Dry, lbs. | Wet, lbs. |
| Delaminated clay (66% clay) | 46 | 69.7 | 56 | 84.8 |
| TiO₂ | 4 | 4.0 | 4 | 4.0 |
| Satin white (25% solids) | 50 | 200.0 | 40 | 160.0 |
| Oxidized starch (26% solution) | 35 | 134.6 | 31 | 119.2 |
| Water | | 13.7 | | 12.0 |
| Total | | 422.0 | | 380.0 |

In the above formulations, the oxidized starch employed was a type having the viscosity designation "U-8" obtained from Pennick and Ford. The titanium dioxide employed was "LDC" TiO₂, a water dispersible anatase, obtained from Glidden Corp. The coating composition in which satin white comprised only 40% of the coating pigment represents a more difficult test for filling and gloss. Since this composition contains a higher percentage of solids, there is less water to be removed in drying and it is, therefore, preferred commercially, provided papers coated with it are satisfactory.

In the following examples, opacity, brightness, gloss, pick and smoothness are determined by standard TAPPI procedures. Opacity was determined using a Bausch and Lomb meter; the readings are relative to 100% opacity. Brightness was determined using a Hunter meter; the values recited represent a percent reflection relative to a known standard. Gloss is measured by the 75° Hunter method; smoothness is measured by a Sheffield meter; and pick refers to Dennison wax pick. With respect to gloss, brightness, opacity, and pick, the higher the reading the better; with respect to smoothness, the lower the reading the better.

Filling is determined by selecting certain sheets, known by the results of the previous tests to be typical examples of a certain variant in which factors of rawstock variation and coat weight variation can be discounted. These samples are compared for surface quality by putting them side-by-side on a slanted board, oriented so that grain direction and coating direction are the same, and illuminating them by means of a collimated beam at an angle of 10 to 15°. The sheets are then compared with a 10× magnifying glass to determine how well the voids have been filled. Although objective numerical designations for the quality of filling cannot be assigned, relative rating is quite easy. The sheets in which the voids have been filled the best are given a 1 rating; as a quality of the filling decreases higher numbers are assigned.

All readings given with respect to coated sheets represent the average values of at least two sheets processed under identical conditions. Coating weight in the following examples is given in total coating weight for two sides of paper in pounds per ream (3,330 sq. ft.).

Example 1

This example illustrates the importance of using rapid agitation. Two batches of satin white were prepared; the lime slurry of the first batch contained 4.0% initial lime solubility; the total amount of water in the reaction mixture was regulated so that at the completion of the batch it contained 5% satin white solids at 105° C.; and the alum was added at a substantially uniform rate over a period of 29½ minutes. The lime slurry of the second batch contained 4.44% initial lime solubility, 5% satin white solids at 105° C. and the alum was added substantially uniformly over a period of 31½ minutes. All other process limitations were substantially identical except that the first batch was mixed in a Cowles dissolver while the second batch was mixed in a Hobart mixer. The Hobart mixer is a much slower mixer than the Cowles dissolver. The satin white obtained from both batches was compounded into coating compositions in accordance with formulation A, referred to above, and coated, under substantially identical conditions, onto paper. The coated papers were tested, giving the following results:

| Property | Batch 1 | Batch 2 |
|---|---|---|
| Coated weights (pounds per ream) | 4.8 | 4.7 |
| Gloss | 38.5 | 36.2 |
| Opacity | 91.3 | 90.7 |
| Brightness | 70.0 | 69.4 |

In addition to the above-listed properties, the pick of the batch in which the Cowles dissolver was employed was decidedly superior. It is readily apparent from the above data that the coating composition prepared from the satin white batch in which the higher speed mixer was used was superior.

Example 2

This example illustrates the importance of using high purity reactants. Three batches of satin white were made under substantially identical conditions; the process was regulated for all three batches so that upon completion of a batch 5% satin white solids were present. The first batch was prepared using a lime containing 95% calcium hydroxide and regular papermaker's alum which contains approximately 1200 to 1800 parts per million iron. The second batch was prepared from lime containing 97.7% calcium hydroxide and regular papermaker's alum. The third batch was prepared from lime containing 97.7% calcium hydroxide and low iron alum (300 to 1100 p.p.m. iron). The satin whites obtained from the three batches were compounded into coating compositions in accordance with formulation A and coated on the paper under substantially identical conditions. The resultant paper had the following properties:

| Property | Batch 1 (95% Ca(OH)$_2$, regular papermaker's alum) | Batch 2 (97.7% Ca(OH)$_2$, regular papermaker's alum) | Batch 3 (97.7% Ca(OH)$_2$, low iron alum) |
|---|---|---|---|
| Coat weight | 4.7 | 4.7 | 4.6 |
| Gloss | 35.4 | 37.3 | 38.1 |
| Opacity | 89.5 | 89.9 | 89.9 |

As the above data shows, the paper coated with the composition containing satin white prepared from both high purity lime and high purity alum has superior gloss and opacity.

Example 3

This example further illustrates the importance of using high purity lime. Two batches of satin white were prepared under substantially identical conditions; the processes were regulated so that the completed batches contained 9% satin white solids at 105° C. and the reactions were terminated at a pH of 10.7. The first batch was prepared from lime approximately two months old; the second batch was prepared from fresh lime containing 97.7% calcium hydroxide. All other process conditions were substantially identical. The two-month old lime was stored in an air tight flexible polyethylene container. The lime was only exposed to the atmosphere very briefly from time-to-time as small samples were withdrawn. After a sample was withdrawn, excess air was squeezed out from the top of the bag, and the bag twisted and sealed. The satin white obtained from each batch was compounded into a coating composition in accordance with formulation A and coated onto paper under substantially identical conditions. The resultant papers had the following properties:

| Property | Batch 1 (2 month old lime) | Batch 2 (fresh lime) |
|---|---|---|
| Coat weight | 4.7 | 4.7 |
| Gloss | 37.3 | 38.2 |
| Opacity | 91.2 | 91.5 |

Obviously the product of batch 2 was superior.

Example 4

This example illustrates the importance of the alum addition rate. Three batches were prepared under substantially identical conditions, except that equal amounts of identical alum solutions were added to the three batches at different rates. The alum solution was added to the first batch over a period of 41 minutes, to the second batch over a period of 11 minutes, and to the third batch over a period of three minutes. The slurries all contained, initially, 2.2% solubilized lime and satin white solids present in all three batches at the termination of the reaction was 5% at 105° C. No problem was encountered with respect to the viscosity of the first batch throughout the alum addition; with the second batch, the viscosity increased to the extent to be a problem after three and one-half minutes; with the third batch the viscosity became so high as to make mixing difficult after a minute and a half. Mixing was continued after the addition of the alum so that the total mixing time for all three batches was identical. The resultant satin white was compounded into coating composition in accordance with formulation A and coated onto paper under identical conditions. The resultant papers had the following characteristics:

| Property | Batch 1 (alum addition time of 41 min.) | Batch 2 (alum addition time of 11 min.) | Batch 3 (alum addition time of 3 min.) |
|---|---|---|---|
| Coat weight | 4.6 | 4.7 | 4.7 |
| Gloss | 34 | 33.9 | 33.1 |
| Opacity | 91.6 | 91.0 | 91.1 |
| Filling | 1 | 2 | 3 |

Considering all of the properties, the product of batch 1 was superior to that of batch 2, while the product of batch 2 was superior to that of batch 3. In addition to the above-listed properties, it was found that coating compositions, prepared from the products of batches 1, 2 and 3, containing, respectively, 29% by weight solids, 26.5% by weight solids and 25% by weight solids, all had equal viscosities. It is readily apparent that, at a given viscosity, the more solids present the better.

Example 5

This example illustrates the importance of the amount of satin white solids present in the completed batch. Four batches of satin white were prepared having the following satin white solids (percent by weight at 105° C., based on total weight of water and reactants) initial lime solubility (percent by weight of total calcium hydroxide), and length of time for completion of batch:

| | Batch 1 | Batch 2 | Batch 3 | Batch 4 |
|---|---|---|---|---|
| Satin white solids, percent | 5 | 10 | 15 | 20 |
| Initial lime solubility | 4.44 | 2.15 | 1.36 | ¹1.0 |
| Time to complete batch | 31.5 | 53 | 82 | 107 |

¹ Minus.

It was necessary to vary the initial lime solubility to get the desired range of satin white solids. The time for the completion of the batches varied roughly in ratio to the amount of satin white produced. All other process conditions were identical. The satin white obtained from these four batches was compounded into coating compositions in accordance with formulation A and coated onto paper under substantially identical conditions. The resultant paper had the following characteristics:

| Property | Batch 1 (5% satin white solids) | Batch 2 (10% satin white solids) | Batch 3 (15% satin white solids) | Batch 4 (20% satin white solids) |
|---|---|---|---|---|
| Coat weight | 4.7 | 4.8 | 4.6 | 4.7 |
| Gloss | 36.2 | 37.1 | 33.6 | 31.5 |
| Filling | 1 | 2 | 3 | 3 |

The product of batch 1 (5% solids) gave the best filling; the product of batch 2 (10% solids) had the best gloss. The products of batches 2 and 3 were inferior to the products of batches 1 and 2 with respect to both filling and gloss.

Example 6

This example illustrates the effect of varying the initial lime solubility. Four batches of satin white, each of which contained 5% satin white solids at 105° C. upon completion, were prepared under identical conditions, except that the initial lime solubility (I. L. S.) for the four batches was respectively 0.5%, 1.0%, 2.0%, and 4.0% by weight of the total hydrated lime present. The satin white contained in these four batches was compounded into coating compositions in accordance with formulation A, and coated onto paper under identical conditions. The resultant paper had the following characteristics:

| Property | Batch 1 (0.5% I.L.S.) | Batch 2 (1.0% I.L.S.) | Batch 3 (2.0% I.L.S.) | Batch 4 (4.0% I.L.S.) |
|---|---|---|---|---|
| Coat weight | 4.8 | 4.8 | 4.8 | 4.7 |
| Gloss | 33.7 | 36.8 | 37.7 | 35.3 |
| Smoothness | 33 | 29 | 29 | 31 |

As may be seen from the above data, the product of batch 1 was clearly inferior to the products of the other batches.

Example 7

This example illustrates the importance of the temperature during the reaction period. Two batches of satin white were prepared, each of which contained 5.1% satin white solids at 105° C. upon completion, under identical conditions, except that the temperature of the first batch was maintained between 54 and 58° F., while the temperaturee of the second batch was maintained between 82.0 and 83.5° F. The reaction, with respect to both batches was stopped at a pH of 10.8. The satin white obtained from these batches was compounded into coating compositions in accordance with formulation A; 4.7 pounds per ream of each coating was placed on paper under identical conditions. Satin white from either batch resulted in papers having equal gloss, however, the opacity of the paper coated with the coating composition containing the satin white produced at 54 to 58° F. was 91.2 compared with an opacity of 91.9 for the paper coated with the composition containing the satin white prepared at 82 to 83.5° F. In addition, filling of the coating composition containing the satin white prepared at 54 to 58° F. was very inferior to that of the coating composition containing the satin white prepared at 82 to 83.5° F.

Example 8

The following example further illustrates the importance of regulating the temperature during the reaction period. Three batches of satin white, containing 5% satin white solids at 105° C. upon completion, were prepared under substantially identical conditions, except that the temperature of the first batch was maintained between 93 and 97° F., and the reaction was terminated at a pH of 10.7; the temperature of the second batch was maintained between 113 and 115.5° F. and the pH was terminated at 10.65; and the temperature of the third batch was maintained at 83° F., and the reaction was terminated at a pH of 10.5. The satin white obtained from the three batches was compounded into coating compositions in accordance with formulation A and coated onto paper under substantially identical conditions. The resultant paper had the following properties:

| Property | Batch 1 (93–97° F.) | Batch 2 (113–115.5° F.) | Batch 3 83° F.) |
|---|---|---|---|
| Coat weight | 4.7 | 4.8 | 4.7 |
| Gloss | 36.2 | 31.0 | 35.1 |
| Opacity | 91.8 | 91.1 | 91.7 |
| Filling | 1 | 2 | 2 |

Obviously the product of batch 1 was superior to the products of the other two batches.

Example 9

Six batches of satin white were prepared under conditions noted below:

| Property | Batch 1 | Batch 2 | Batch 3 | Batch 4 | Batch 5 | Batch 6 |
|---|---|---|---|---|---|---|
| Satin white solids (percent by wt. at 105° C.) | 7 | 9 | 11 | 9 | 9 | 9 |
| Initial lime solubility (percent by wt.) | 2 | 2 | 1.6 | 2 | 2 | 2 |
| Temperature, ° F | 95 | 95 | 95 | 85 | 95 | 105 |
| Time to complete batch (min.) | 60 | 60 | 60 | 30 | 30 | 30 |
| pH | 12.0 | 12.2 | 12.2 | 12.2 | 12.2 | 12.2 |

Satin white obtained from six batches was compounded into coating compositions in accordance with formulation A and coated onto paper under substantially identical conditions. The resultant paper had the following characteristics:

| Property | Batch 1 | Batch 2 | Batch 3 | Batch 4 | Batch 5 | Batch 6 |
|---|---|---|---|---|---|---|
| Coat weight (lb./ream) | 4.7 | 4.8 | 4.7 | 4.7 | 4.7 | 4.7 |
| Gloss | 36.5 | 36.7 | 36.0 | 35.4 | 37.1 | 37.3 |
| Filling | 2 | 1 | 1 | 3 | 1 | 1 |

Example 10

The following example demonstrates the importance of controlling the pH end point of the reaction. Four batches of satin white, containing 6% satin white solids at 105° C. upon completion of the batch, were prepared under identical conditions except that the reactions of the four batches were terminated, respectively, at pH's of 12.2, 10.8, 9.43, and 8.9. The satin white obtained from the four batches was compounded into coating compositions in accordance with formulation A and coated onto paper under identical conditions. The resultant papers had the following characteristics:

| Property | Batch 1 (pH 12.2) | Batch 2 (pH 10.8) | Batch 3 (pH 9.43) | Batch 4 (pH 8.9) |
|---|---|---|---|---|
| Coat weight | 4.7 | 4.7 | 4.7 | 4.7 |
| Gloss | 39.3 | 36.7 | 35.7 | 25.0 |
| Brightness | 67.8 | 68.8 | 68.4 | 66 |
| Smoothness | 29 | 33 | 32 | 32 |
| Pick | 7 | 5 | 7 | 7 |

The product of batch 1 was the best, while that of batch 4 was the worst.

Example 11

The following example further illustrates the importance of controlling the pH end point. Three batches of satin white, containing 9% satin white solids at 105° upon completion, were prepared under identical conditions, except that the reactions of the three batches were terminated, respectively, at pH's of 9.8, 10.7, and 12.3. The satin white obtained from the three batches was compounded into coating compositions in accordance with formulation A and coated onto paper under identical conditions. The resultant paper had the following properties:

| Property | Batch 1 (pH 9.8) | Batch 2 (pH 10.7) | Batch 3 (pH 12.3) |
|---|---|---|---|
| Coat weight | 4.7 | 4.7 | 4.7 |
| Gloss | 36.5 | 38.2 | 39.5 |
| Opacity | 91.3 | 91.5 | 92.0 |
| Smoothness | 37 | 36 | 32 |
| Pick | (¹) | (¹) | (¹) |
| Filling | 2 | 2 | 1 |
| Coating solids at equal viscosity, percent | 30.7 | 30.5 | 32.0 |
| Grams binder/100 grams pigment | 39 | 39 | 36 |

¹ All equal.

During the preparation of these batches of satin white certain observations were made; it was noted that the viscosity at the end point of the batch in which the reaction was terminated at a pH of 12.3 was at about a minimum; as the pH approaches 10.7, the batch gets sufficiently viscous so that adequate mixing is difficult. It is also noted that the batch in which the reaction was terminated at a pH of 12.3 gave the highest amount of satin white solids after filtering. The amount of satin white solids after filtering for the three batches were respectively, in percent by weight, 21.46%, 21.22% and 24.66%. It was also noted that the coating composition containing the satin white obtained from the batch in which the reaction was terminated at a pH of 12.3 not only has a better gloss, smoothness, and filling, but the binder demand is as much as 10% less than that of the coating compositions containing satin white obtained from batches in which the reaction was terminated at less than a pH of 11. Moreover, at equal viscosities, the amount of solids present is as much as 1.5% higher with the products obtained at a pH of greater than 12.

Example 12

This example is intended to illustrate that if too much alum is added, the batch may be corrected by adding additional lime. This example also serves to compare the results obtained from a large-scale (1,000 gallons, 9,300 pounds) production batch with the results obtained with laboratory scale batches (generally about 600 grams). Three batches of satin white, containing 9% satin white solids at 105° C. upon completion, were prepared. The batches were initially prepared under substantially identical conditions, except that the first two batches were prepared on a laboratory scale, while the third batch was prepared on a production scale, using of course, much larger equipment and much larger amounts of reactants. The reaction in all three batches was terminated at a pH of 12.2; 6% additional alum was added to the second batch to bring the pH down to 9.4. It was then attempted to correct the pH back to 12.2 (the final pH was in fact 12.15) by adding additional lime. Satin white obtained from all three batches was compounded into paper coating compositions in accordance with formulation B and coated onto paper under substantially identical conditions. The resultant paper had the following characteristics:

| Property | Batch 1 (lab scale- pH 12.2) | Batch 2 (lab scale- pH corrected to 12.15) | Batch 3 (production scale pH 12.2) |
|---|---|---|---|
| Coat weight | 5.0 | 5.0 | 5.1 |
| Gloss | 36.1 | 37.7 | 39.0 |
| Opacity | 89.3 | 89.8 | 90.0 |
| Brightness | 67.3 | 67.4 | 67.7 |
| Smoothness | 33 | 32 | 30 |
| Pick | (¹) | (¹) | (¹) |
| Filling | (¹) | (¹) | (¹) |

¹ All equal.

The above data illustrates the coating composition containing the satin white in which the pH had been allowed to go down to 9.4 and corrected to 12.15, was substantially as good as that of the batch in which the reaction was properly terminated in the first instance.

The above data further illustrates that coating compositions prepared from satin white obtained from full sized production batches is superior to the coating compositions prepared from satin white produced on a laboratory scale. This is probably due to faster and more efficient mixing obtained on a production scale.

We claim:
1. A process for producing satin white in a form particularly suitable for use as a coating pigment comprising
   (A) preparing an aqueous slurry of hydrated lime;
      (1) said lime containing at least about 97% by weight $Ca(OH)_2$;
      (2) said slurry containing sufficient water so that initially from about 1.0% to about 5.7% by weight of the total $Ca(OH)_2$ present in solubilized;
   (B) adding to said slurry a sufficient amount of an aqueous alum solution so that the pH of the reaction mixture will be, after completion of the alum solution addition, within the range of about 12.3 to about 9.5;
   (C) said alum solution being added over a period of time of no less than 2.5 minutes for every 1% by weight satin white solids, calculated as satin white at 105° C. and based on the total weight of water and reactants employed, present in the reaction mixture at the completion of the reaction;
   (D) rapidly agitating said reaction mixture while adding said alum solution;
   (E) maintaining the temperature of said reaction mixture in the range of from about 85° F. to about 110° F. substantially throughout the reaction;
   (F) regulating the total amount of water in the reaction mixture so that the reaction mixture, at the completion of the reaction, contains between about 5% and about 12% by weight satin white solids at 105° C., based on the total weight of the water and reactants employed.

2. The process of claim 1 in which said slurry contains sufficient water so that initially from about 2.0% to about 4.5% by said weight of the total $Ca(OH)_2$ present is solubilized.

3. The process of claim 1 in which the alum of said aqueous alum solution contains no more than 1100 p.p.m. iron.

4. The process of claim 1 in which said aqueous alum solution is sprayed into said slurry at a substantially uniform rate.

5. The process of claim 4 in which said aqueous alum solution is added to said slurry over a period of time of no less than 3 minutes for every 1% by weight satin white solids, calculated as satin white at 105° C. and based on the total weight of water and reactants employed, present in the mixture at the completion of the reaction.

6. The process of claim 1 in which a sufficient amount of said aqueous alum solution is added to said slurry so that the pH of the reaction mixture will be, after completion of the alum solution addition, above 11.8.

7. The process of claim 1 in which a sufficient amount of said aqueous alum solution is added to said slurry so that the pH of the reaction mixture will be, after completion of the alum solution addition, within the range of about 12.1 to 11.9.

8. The process of claim 1 in which the temperature of said reaction mixture is maintained in the range of from about 95° F. to 105° F. throughout the reaction period.

9. The process of claim 1 in which the total amount of water in the reaction mixture is regulated so that the reaction mixture, at the completion of the reaction, contains between about 9% and about 11% by weight satin white solids at 105° C., based on the total weight of the water and reactants employed.

10. A process for producing satin white in a form particularly suitable for use as a coating pigment comprising
   (A) preparing an aqueous slurry of hydrated lime;
      (1) said lime containing at least about 97% by weight $Ca(OH)_2$;
      (2) said slurry containing sufficient water so that initially from about 1.0% to about 5.7% by weight of the total $Ca(OH)_2$ present is solubilized;
   (B) adding to said slurry a sufficient amount of an aqueous alum solution so that the pH of the reaction mixture is, after completion of the alum solution addition, less than 11.8;
   (C) said alum solution being added over a period of time of no less than 2.5 minutes for every 1% by weight satin white solids, calculated as satin white at 105° C. and based on the total weight of water and reactants employed, present in the reaction mixture at the completion of the reaction;
(D) adding to said reaction mixture a sufficient amount of hydrated lime so that the pH of the reaction mixture will be within the range of about 12.3 to about 11.8;
(E) rapidly agitating said reaction mixture while adding said alum solution;
(F) maintaining the temperature of said reaction mixture in the range of from about 85° F. to about 110° F. substantially throughout the reaction; and
(G) regulating the total amount of water in the reaction mixture so that the reaction mixture at the completion of the reaction contains between about 5% and about 12% by weight satin white solids at 105° C., based on the total weight of the water and reactants employed.

11. A process for producing satin white in a particulate form suitable for use as a coating pigment comprising
(A) preparing an aqueous slurry of hydrated lime;
 (1) said lime containing at least about 97% by weight $Ca(OH)_2$;
 (2) said slurry containing sufficient water so that initially from about 2.0% to about 4.5% by weight of the $Ca(OH)_2$ present is solubilized;
(B) adding to said slurry a sufficient amount of an aqueous alum solution so that the pH of the reaction mixture will be, after completion of the alum solution addition, within the range of about 12.3 to 11.8;
(C) said aqueous alum solution is added to said slurry over a period of time of no less than 3 minutes for every 1% by weight satin white solids, calculated as satin white at 105° C. and based on the total weight of water and reactants employed, present in the reaction mixture at the completion of the reaction;
(D) rapidly agitating said reaction mixture while adding said alum solution;
(E) maintaining the temperature of said reaction mixture in the range of from about 95° F. to about 105° F. substantially throughout the reaction; and
(F) regulating the total amount of water in the reaction mixture so that the reaction mixture, at the completion of the reaction, contains between about 9% to about 11% by weight satin white solids at 105° C., based on the total weight of the water and reactants employed.

References Cited

UNITED STATES PATENTS

| | | | |
|---|---|---|---|
| 1,470,765 | 10/1923 | Ryan | 106—306 |
| 1,632,891 | 6/1927 | Fredriksson | 106—306 |
| 1,863,663 | 6/1932 | Lauderman | 106—306 |

OTHER REFERENCES

TAPPI Monograph Series No. 20, "Paper Coating Pigments," p. 144 (1958), also pp. 130–143 and 145–148.

TOBIAS E. LEVOW, Primary Examiner

H. M. S. SNEED, Assistant Examiner

U.S. Cl. X.R.

106—306